(12) United States Patent
Moskovich

(10) Patent No.: US 6,417,971 B1
(45) Date of Patent: *Jul. 9, 2002

(54) ZOOM PROJECTION LENS HAVING A LENS CORRECTION UNIT

(75) Inventor: Jacob Moskovich, Cincinnati, OH (US)

(73) Assignee: U.S. Precision Lens Incorporated, Cincinnati, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/485,278

(22) PCT Filed: Aug. 5, 1997

(86) PCT No.: PCT/US98/15934

§ 371 (c)(1),
(2), (4) Date: Feb. 4, 2000

(87) PCT Pub. No.: WO99/08138

PCT Pub. Date: Feb. 18, 1999

Related U.S. Application Data

(60) Provisional application No. 60/054,762, filed on Aug. 5, 1997.

(51) Int. Cl.[7] .............. G02B 3/00; G02B 9/00; G02B 15/14
(52) U.S. Cl. ................... 359/649; 359/676
(58) Field of Search ................ 359/649, 650, 359/651, 676, 684, 686, 689, 680–682

(56) References Cited

U.S. PATENT DOCUMENTS

| | | | | |
|---|---|---|---|---|
| 4,963,007 A | * | 10/1990 | Moskovich | 359/649 |
| 5,313,330 A | * | 5/1994 | Betensky | 359/676 |
| 5,367,405 A | * | 11/1994 | Sado | 359/649 |

* cited by examiner

*Primary Examiner*—Jordan M. Schwartz
(74) *Attorney, Agent, or Firm*—Maurice M. Klee

(57) ABSTRACT

A zoom projection lens for use with LCD or DMD panels is provided. The lens has two units U1 and U2, which are moved relative to one another for zooming. It also has a corrector unit (CR) at a fixed distance from the LCD or DMD panel (PP). The corrector unit, which may be a color correcting doublet, is at the object (panel) end of the lens and has a weak power. This unit allows for a high level of distortion and lateral color correction, without unduly increasing the complexity or cost of the lens.

15 Claims, 6 Drawing Sheets

ZOOM PROJECTION LENS HAVING A LENS CORRECTION UNIT

CROSS REFERENCE TO RELATED PROVISIONAL APPLICATION

This application claims the benefit under 35 USC §119(e) of U.S. Provisional Application No. 60/054,762 filed Aug. 5, 1997, the content of which in its entirety is hereby incorporated by reference.

FIELD OF THE INVENTION

This invention relates to projection lenses and, in particular, to zoom projection lenses which can be used, inter alia, to form an image of an object composed of pixels, such as, a liquid crystal display (LCD) or digital mirror device (DMD).

BACKGROUND OF THE INVENTION

Projection lens systems (also referred to herein as "projection systems") are used to form an image of an object on a viewing screen. The basic structure of such a system is shown in FIG. 6, wherein 10 is a light source (e.g., a tungsten-halogen lamp), 12 is illumination optics which forms an image of the light source (hereinafter referred to as the "output" of the illumination system), 14 is the object which is to be projected (e.g., a matrix of on and off pixels), and 13 is a projection lens, composed of multiple lens elements, which forms an enlarged image of object 14 on viewing screen 16. FIG. 6 is drawn for the case of a LCD panel where the output of the illumination system strikes the back of the panel and passes through those pixels which are transparent. DMDs, on the other hand, work by reflection and thus the output of the illumination system is routed to the front of the panel by a prism or similar device.

Projection lens systems in which the object is a pixelized panel are used in a variety of applications, including data display systems. Such projection lens systems preferably employ a single projection lens which forms an image of either a single panel having, for example, red, green, and blue pixels, or three individual panels, one for each color. In some cases, two panels are used, one for two colors, e.g., red and green, and the other for one color, e.g., blue. A spinning filter wheel or similar device is associated with the panel for the two colors and the panel is alternately fed information for the two colors in synchrony with the filter.

There exists a need in the art for a projection lens for use with a pixelized panel which simultaneously has at least the following properties: (1) the ability to zoom between a maximum effective focal length and a minimum effective focal length; (2) a long back focal length (working distance); (3) a high level of color correction; (4) low distortion; and (5) low sensitivity to temperature changes.

A projection lens which can efficiently operate over a range of focal lengths is desirable since it allows the projection system to be used with screens of different sizes and halls of different dimensions without the need to change any of the components of the system. The challenge, of course, is to maintain a high level of aberration correction throughout the operative range of focal lengths without unduly complicating the lens design.

A long back focal length, i.e., the distance from the last lens surface to the pixelized panel, is needed, especially where multiple panels are used, to accommodate the optical elements, e.g., filters, dichroic beam splitters, beamsplitting prisms, and the like, used in combining the light from the different color optical paths which the lens system projects towards the viewing screen. In addition, a long back focal length allows the output of the illumination system to be in the vicinity of the projection lens for output distances which are relatively large. Relatively large output distances are desirable since they provide relatively shallow entrance angles for the light at the pixelized panel which is especially important in the case of LCD panels.

A high level of color correction is important because color aberrations can be easily seen in the image of a pixelized panel as a smudging of a pixel or, in extreme cases, the complete dropping of a pixel from the image. These problems are typically most severe at the edges of the field.

All of the chromatic aberrations of the system need to be addressed, with lateral color, chromatic variation of coma, and chromatic aberration of astigmatism typically being most challenging. Lateral color, i.e., the variation of magnification with color, is particularly troublesome since it manifests itself as a decrease in contrast, especially at the edges of the field. In extreme cases, a rainbow effect in the region of the full field can be seen.

In projection systems employing cathode ray tubes (CRTs) a small amount of (residual) lateral color can be compensated for electronically by, for example, reducing the size of the image produced on the face of the red CRT relative to that produced on the blue CRT. With a pixelized panel, however, such an accommodation cannot be performed because the image is digitized and thus a smooth adjustment in size across the full field of view is not possible. A higher level of lateral color correction is thus needed from the projection lens.

The use of a pixelized panel to display data leads to stringent requirements regarding the correction of distortion. This is so because good image quality is required even at the extreme points of the field of view of the lens when viewing data. As will be evident, an undistorted image of a displayed number or letter is just as important at the edge of the field as it is at the center. Moreover, projection lenses are often used with offset panels, the lenses of Examples 1–5 being designed for such use. In such a case, the distortion at the viewing screen does not vary symmetrically about a horizontal line through the center of the screen but can increase monotonically from, for example, the bottom to the top of the screen. This effect makes even a small amount of distortion readily visible to the viewer.

Low distortion and a high level of color correction are particularly important when an enlarged image of a WINDOWS type computer interface is projected onto a viewing screen. Such interfaces with their parallel lines, bordered command and dialog boxes, and complex coloration, are in essence test patterns for distortion and color. Users readily perceive and object to even minor levels of distortion or color aberration in the images of such interfaces.

In order to produce an image of sufficient brightness, a substantial amount of light must pass through the projection lens. As a result, a significant temperature difference normally exists between room temperature and the lens' operating temperature. In addition, the lens needs to be able to operate under a variety of environmental conditions. For example, projection lens systems are often mounted to the ceiling of a room, which may comprise the roof of a building where the ambient temperature can be substantially above 40° C. To address these effects, a projection lens whose optical properties are relatively insensitivity to temperature changes is needed.

One way to address the temperature sensitivity problem is to use lens elements composed of glass. Compared to plastic, the radii of curvature and the index of refraction of a glass element generally change less than those of a plastic element. However, glass elements are generally more expensive than plastic elements, especially if aspherical surfaces are needed for aberration control. They are also heavier. As described below, plastic elements can be used and temperature insensitivity still achieved provided the powers and locations of the plastic elements are properly chosen.

The projection lenses described below achieve all of the above requirements and can be successfully used in producing relatively low cost projection lens systems capable of forming a high quality color image of a pixelized panel on a viewing screen.

DESCRIPTION OF THE PRIOR ART

Projection lenses for use with pixelized panels are described in various patents including Taylor, U.S. Pat. No. 4,189,211, Tanaka et al., U.S. Pat. No. 5,042,929, Yano et al., U.S. Pat. No. 5,179,473, Moskovich, U.S. Pat. No. 5,200,861, Moskovich, U.S. Pat. No. 5,218,480, Moskovich, U.S. Pat. No. 5,625,495, Iizuka et al., U.S. Pat. No. 5,278, 698, Betensky, U.S. Pat. No. 5,313,330, and Yano, U.S. Pat. No. 5,331,462.

Discussions of LCD systems can be found in Gagnon et al., U.S. Pat. No. 4,425,028, Gagnon, U.S. Pat. No. 4,461, 542, Ledebuhr, U.S. Pat. No. 4,826,311, and EPO Patent Publication No. 311,116.

SUMMARY OF THE INVENTION

In view of the foregoing, it is an object of the present invention to provide improved projection lenses for use with pixelized panels which simultaneously have each of the five desired properties discussed above. This object is achieved by means of a zoom projection lens which has a minimum effective focal length ($f_{min}$) and a maximum effective focal length ($f_{max}$) and comprises in order from the lens' image side to its object side (i.e., from its long conjugate side to its short conjugate side):

(A) a first lens unit (U1);

(B) a second lens unit (U2) separated from the first lens unit by an axial space, said first and second lens units being moved relative to the pixelized panel (object) during zooming and/or focusing of the lens; and (C) a corrector lens unit (CR) having at least one aspherical surface and a focal length $f_{CR}$ which satisfies the relationship:

$$|f_{CR}/f_{min}| \geq 5; \quad (1)$$

said corrector lens unit being separated from the pixelized panel by a fixed axial distance $D_{CR-OB}$ and from the second lens unit by a variable axial distance $D_{CR-U2}$ where:

$$D_{CR-OB} \geq D_{CR-U2} \quad (2)$$

for all effective focal lengths of the lens between $f_{min}$ and $f_{max}$.

As used in relationship (2), $D_{CR-OB}$ is the distance from the object to the surface of the corrector lens unit closest to the object, and $D_{CR-U2}$ is the distance from the image side surface of CR to the object side surface of U2.

In certain preferred embodiments, the projection lens also satisfies the relationship:

$$D_{CR-OB}/(f_{min} \cdot \tan \omega) \geq 2 \quad (3)$$

where $\omega$ is the projection lens' half field of view in the direction of the image when the lens' effective focal length is equal to $f_{min}$. When the lens satisfies this relationship, it has a back focal length which is sufficiently long to accommodate the optical elements used to form a color image from pixelized panels, e.g., the filters, dichroic beam splitters, beamsplitting prisms, and the like which are placed between the corrector lens unit and the pixelized panels.

It should be noted that the corrector lens unit of the present invention has different properties and different functions than the condenser lens of Iizuka et al., U.S. Pat. No. 5,278,698. The condenser lens of the '698 patent is located close to the pixelized panel specifically, closer to the pixelized panel than to the positive lens unit of the '698 patent, and has substantial optical power so as to direct light from the illumination system into the projection lens. In contrast, the corrector lens unit of the present invention has minimal optical power (see relationship (1) above), is an located far from the pixelized panel, specifically, its spacing from the pixelized panel is greater than its spacing from the lens' second lens unit (see relationship (2) above), and serves to correct residual distortion. More specifically, because the corrector lens unit is located at a substantial distance from the pixelized panel, the size of the axial bundle on the surfaces of the corrector lens unit is not insignificant. Accordingly, this unit contributes to the correction of residual amounts of spherical aberration and, in so doing, allows for better correction of distortion to be accomplished in the front portion of the lens.

In certain embodiments of the invention, the corrector lens unit includes color correcting means, e.g., a color correcting doublet or more generally a positive lens element of low dispersion and a negative lens element of high dispersion. In other embodiments, the first lens unit has a negative power and the second lens unit has a positive power, so that the first and second lens units have the basic structure of a retrofocus lens. In still further embodiments, the lens system includes a positive third lens unit (U3) on the image side of the first lens unit, said third lens unit remaining stationary during zooming and focusing of the lens system.

The projection lenses of the invention are preferably designed to be substantially athermal. As discussed fully below, this is done by using glass and plastic lens elements and by balancing the powers of the plastic lens elements having substantial optical power. In this way, changes in the power of the positive lens elements caused by temperature changes are compensated for by changes in the power of the negative lens elements, thus providing substantially constant overall optical properties for the projection lens as its temperature changes.

The projection lenses of the invention can have a conventional aperture stop or they can be designed using the location of the output of the illumination system as a pseudo-aperture stop/entrance pupil of the projection lens (see Betensky, U.S. Pat. No. 5,313,330, the relevant portions of which are incorporated herein by reference). In this way, efficient coupling is achieved between the light output of the illumination system and the projection lens.

When the pseudo-aperture stop/entrance pupil approach is used, the invention provides a projection lens system which forms an image of an object and comprises:

(a) an illumination system comprising a light source and illumination optics which forms an image of the light source, said image being the output of the illumination system;

(b) a pixelized panel which comprises the object; and (c) a projection lens of the type described above, said projection lens having an entrance pupil whose location substantially corresponds to the location of the output of the illumination system.

Figure 1:
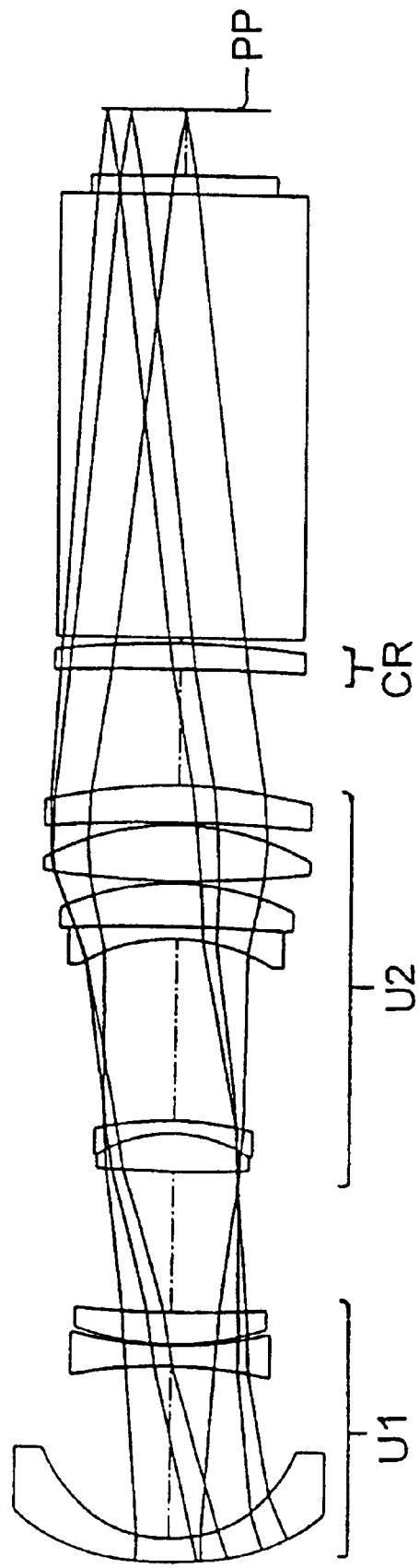
FIGS. 1–5 are schematic side views of projection lenses constructed in accordance with the invention. The pixelized panel with which the lenses are used is shown by the designation "PP" in these figures.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

The projection lenses of the present invention are most frequently used in projection systems which employ three digital devices (three pixelized panels) which create input images in the three primary colors—red, green, and blue. These images are combined by means of dichroic beamsplitters or beamsplitting prisms located between the object and the lens to provide a color image on the screen. To accommodate these components, the projection lens needs to have a long working distance. To accomplish that a retrofocus type of zoom lenses is generally used. This type of zoom lens is characterized by having a negative power group on the long conjugate side and a positive power group on the short conjugate side. Both of these groups move relative to each other to achieve a change in magnification.

In general terms, aberrations can be controlled if enough elements are used in a lens to provide sufficient degrees of freedom. Aspherical plastic elements are occasionally used to reduce the number of elements and to minimize the overall cost of the lens. However, when the field of view becomes fairly wide for a wide angle zoom, e.g., on the order of 30° (half field of view), the correction of distortion and of the lateral color becomes more difficult to attain. As discussed above, the nature of the digital devices used in LCD and DMD projectors, as well as the types of information typically displayed with such devices, are such that both distortion and lateral color must be corrected to a very high degree. As applications of projection systems become more and more demanding with higher resolution requirements, the pixel sizes of the digital devices get smaller and the level of correction of aberrations becomes even more critical.

In accordance with the invention, the required high level of correction of aberrations is achieved without significant increases in the complexity and the cost of the lens by augmenting the above described retrofocus type zoom lens with an additional low power aspherical stationary corrector on the short conjugate side of the lens. In particular, it has been found that a single weak aspherical element achieves excellent correction of residual amounts of various aberrations and especially that of distortion. Preferably, the distortion correction is better than about 2.5 percent throughout the lens' zoom range. As discussed above, the corrector achieves this level of distortion correction for the overall lens by contributing to the correction of residual amounts of spherical aberration which allows for better correction of distortion in the front portion of the lens.

When the corrector unit comprises color correcting means, the correction of lateral color is also improved. Such color correcting means can comprise a negative lens element composed of a high dispersion material and a positive lens element composed of a low dispersion material (see Example 4). If desired, the negative and positive lens elements can be in the form of a cemented doublet. The high and low dispersion materials can be glass or plastic.

In general terms, a high dispersion material is a material having a dispersion like flint glass and a low dispersion material is a material having a dispersion like crown glass. More particularly, high dispersion materials are those having V-values ranging from 20 to 50 for an index of refraction in the range from 1.85 to 1.5, respectively, and low dispersion materials are those having V-values ranging from 35 to 75 for the same range of indices of refraction.

For plastic lens elements, the high and low dispersion materials can be styrene and acrylic, respectively. Other plastics can, of course, be used if desired. For example, in place of styrene, polycarbonates and copolymers of polystyrene and acrylic (e.g., NAS) having flint-like dispersions can be used. See *The Handbook of Plastic Optics,* U.S. Precision Lens, Inc., Cincinnati, Ohio, 1983, pages 17–29.

Zooming of the projection lenses of the invention is achieved through movement of the first and second lens units. Similarly, focusing is achieved through movement of those units. Conventional mechanisms known in the art are used to achieve these movements.

As discussed above, the projection lenses of the invention are athermalized so that the optical performance of the system does not substantially change as the projection lens is heated from room temperature to its operating temperature. More specifically, the thermally-induced change in the back focus distance of the system is preferably less than about 0.2%. The desired thermal stabilization is achieved through the selection and placement in the lens of the plastic lens elements.

Ordinarily, the use of plastic lens elements has the drawback that the refractive index of plastic optical materials changes significantly with temperature. Another effect is the change in shape, i.e., expansion or contraction, of plastic optical materials with temperature. This latter effect is usually less significant than the change in index of refraction.

If only low power plastic lens elements are used in a lens it is possible to achieve a balance between the thermal changes in the plastic optics and the thermal changes in the plastic or aluminum mechanical components of the system, e.g., the lens barrel which is usually the major mechanical source of thermally-caused focus changes. The unrestricted use of optical plastics in a design, i.e., the ability to use plastic lens elements of relatively high power, has advantages in that, since the plastic lens elements can be readily molded, non-spherical optical surfaces (aspherics) can be used to maximize the capability (performance) of a particular lens design. The use of relatively high power plastic elements also leads to a lens having an overall lower cost and lower weight, especially where the lens design involves large lens elements.

If the net plastic optical power in a design is significant, then athermalization needs to be performed or the focus of the lens will change significantly as the lens' temperature changes from room temperature to its operating temperature. This is especially so with projectors which must transmit significant amounts of light to a viewing screen and thus have an operating temperature significantly above room temperature.

For the projection lenses of the present invention, athermalization is achieved by balancing positive and negative plastic optical power, while also taking into account both the location of the plastic lens elements and the marginal ray heights at those elements.

The location of the plastic lens elements is significant in terms of the amount of temperature change the element will undergo and thus the amount of change which will occur in the element's index of refraction. In general, elements close to the light source or the image of the light source will undergo greater temperature changes. In practice, a temperature distribution in the region where the projection lens is to be located is measured with the light source and its associated illumination optics operating and those measured values are used in the design of the projection lens.

The marginal ray height at a particular plastic lens element determines, for a given thermal change, whether changes in the element's index of refraction will be significant with regard to the overall thermal stability of the lens. Elements for which the marginal ray height is small, e.g., elements near the focus of the system, will in general have less effect on the overall thermal stability of the system than elements for which the marginal ray height is large.

Based on the foregoing considerations, athermalization is achieved by balancing the amount of negative and positive power in the plastic lens elements with the contributions of particular elements being adjusted based on the temperature change which the element is expected to undergo and the marginal ray height at the element. In practice, this athermalization procedure is incorporated into a computerized lens design program as follows. First, a ray trace is performed at a first temperature distribution and a back focal distance is calculated. The ray trace can be a paraxial ray trace for the marginal ray. Second, the same ray trace is performed at a second temperature distribution and the back focal distance is again calculated. Neither the first nor the second temperature distribution need be constant over the entire lens but can, and in the typical case does, vary from lens element to lens element. The calculated back focal distances are then constrained to a constant value as the design of the system is optimized using the lens design program.

It should be noted that the foregoing approach assumes that the mechanical mounts for the projection lens and the pixelized panel hold the distance between the last lens surface and the panel substantially constant as the temperature of the system changes. If such an assumption is not warranted, other provisions can be made for performing the athermalization, e.g., a measured value for the relative movement of the mechanical mounts can be included in the process or an alternate distance, e.g., the distance between the front lens surface and the panel, can be assumed to be mechanically fixed.

Figure 2:
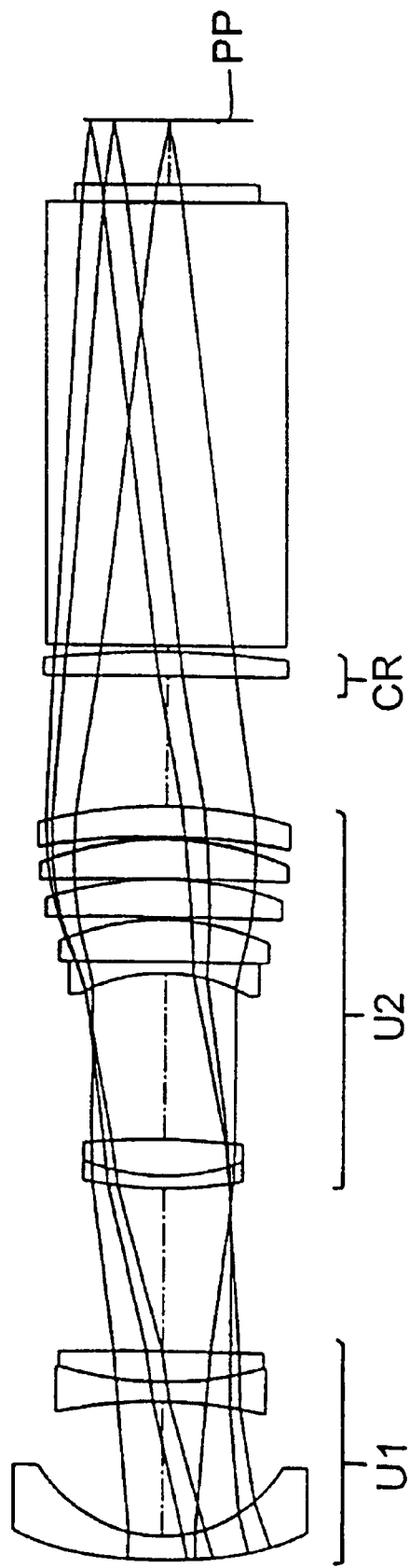
Figure 3:
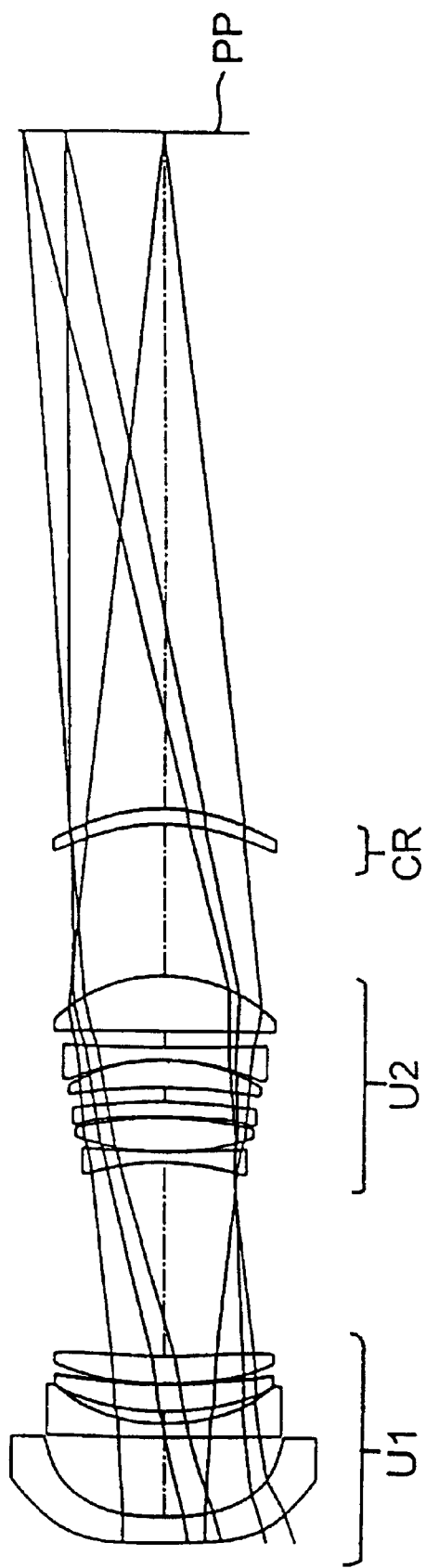
Figure 4:
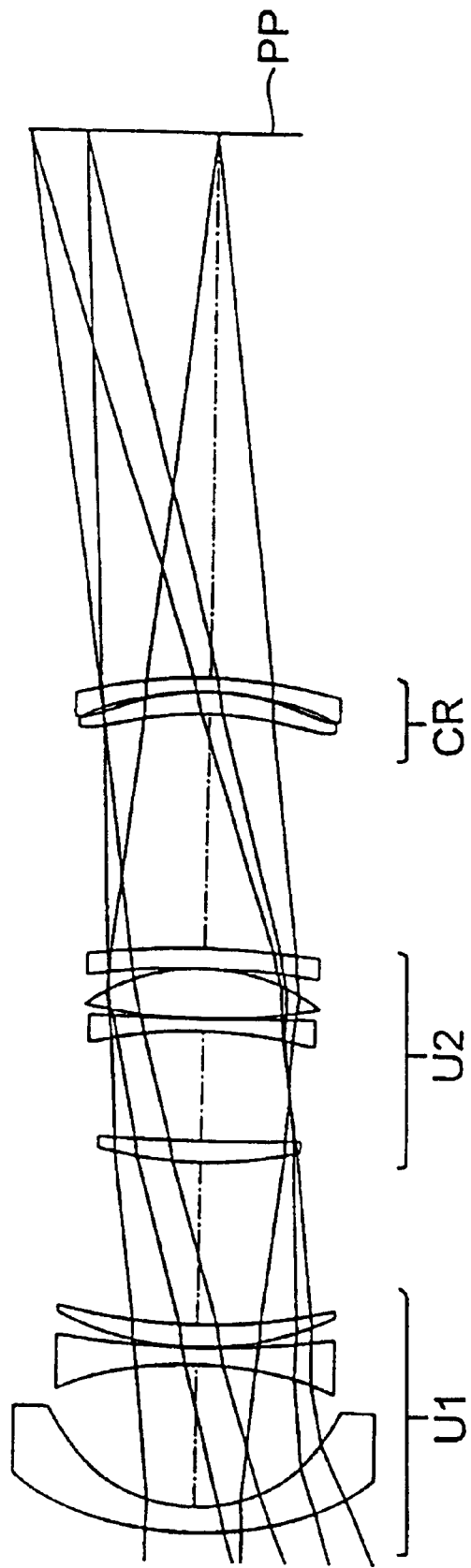
Figure 5:
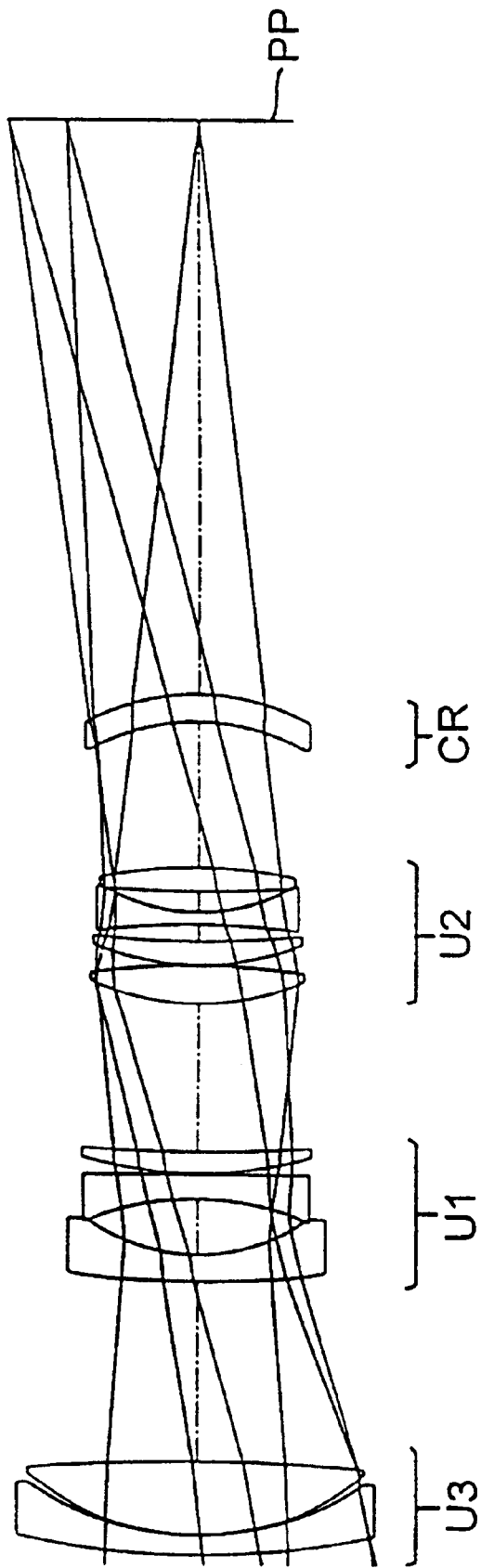
Figure 6:
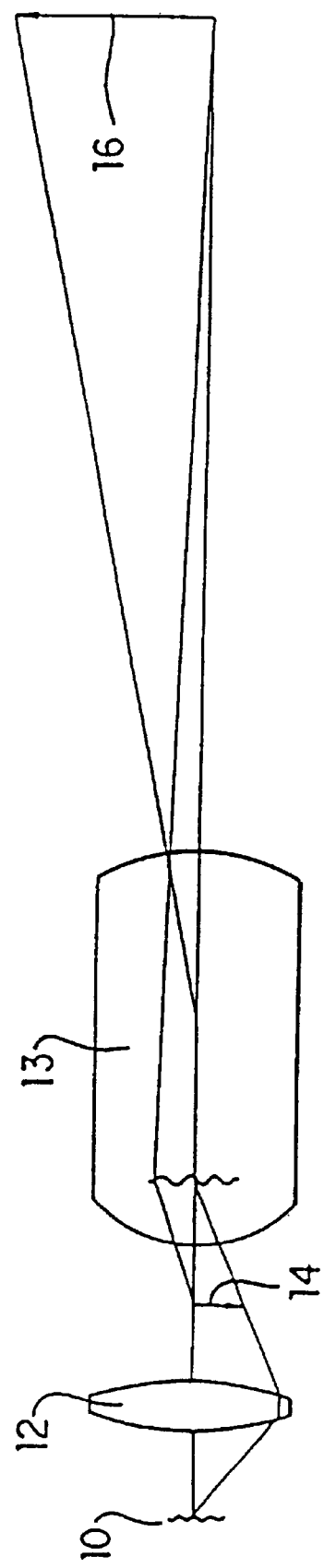
FIG. 6 is a schematic diagram showing an overall projection lens system in which the projection lens of the present invention can be used.

FIGS. 1 to 5 illustrate various projection lenses constructed in accordance with the invention. Corresponding prescriptions and optical properties appear in Tables 1 to 5, respectively. HOYA or SCHOTT designations are used for the glasses employed in the lens systems. Equivalent glasses made by other manufacturers can be used in the practice of the invention. Industry acceptable materials are used for the plastic elements.

The aspheric coefficients set forth in the tables are for use in the following equation:

$$z = \frac{cy^2}{1 + [1 - (1+k)c^2y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant, which is zero for the lens systems of Tables 1–5.

The designation "a" associated with various surfaces in the tables represents an aspheric surface, i.e., a surface for which at least one of D, E, F, G, H, or I in the above equation is not zero. Surface 1 in Tables 3–5 is an optional vignetting surface. Surfaces 20–22 in Table 1 and surfaces 21–23 in Table 2 correspond to optical elements, such as mirrors, prisms, and the like, used in forming a color image from pixelized panels. Although not shown in Tables 3–5, similar optical elements can be used with the lens systems of these tables.

The tables are constructed on the assumption that light travels from left to right in the figures. In actual practice, the viewing screen will be on the left and the pixelized panel will be on the right, and light will travel from right to left. In particular, the references in the tables to objects and images is reverse from that used in the rest of the specification and in the claims. All dimensions given in the tables are in millimeters.

The correspondence between the various elements and surfaces of the lenses of Tables 1–5 and the "first lens unit", "second lens unit", "third lens unit" (optional), and "corrector lens unit" terminology discussed above is set forth in Table 6. In particular, U1 is the first lens unit, U2 is the second lens unit, U3 is the third lens unit, and CR is the corrector lens unit.

The lenses of Examples 1–4 were designed using a conventional aperture stop. Such a conventional aperture stop will in general result in some lost light for some zoom positions, but has the benefit that the output of the illumination system does not have to be fully characterized or controlled. The projection lens of Example 5 was designed using the pseudo-aperture stop/entrance pupil technique of Betensky, U.S. Pat. No. 5,313,330. In accordance with this approach, the illumination system is used to define the entrance pupil for the projection lens, with the entrance pupil being located at a constant position relative to the pixelized panel for all lens focal lengths and conjugates.

The surface labeled "aperture stop" in Table 5 constitutes the pseudo-aperture stop of the above Betensky patent. Its location corresponds to the location of the output of the illumination system. Surface 22 in this prescription is a dummy surface which causes the aperture stop to be within the space defined by the lens' front and back lens surfaces. As can be seen in the subtables labeled "Variable Spaces," the distance from the pseudo-aperture stop to the pixelized panel is essentially constant for all zoom positions of the projection lens of Example 5 (see the column labeled "Image Distance").

Table 6 summarizes various properties of the lenses of Tables 1–5. As shown in this table, the lenses of the examples satisfy relationship (1) above, i.e., they all have a $|f_{CR}/f_{min}|$ ratio which is greater than 5. The $|f_{CR}/f_{min}|$ ratios of these examples are also all greater than 10, as is even more preferred.

As to relationship (2), as can be seen in Tables 1–5, the corrector unit is positioned closer to the lens than to the object and, therefore, the long working distance (distance between the lens and LCD/DMD device) is maintained. Quantitatively, the ratio of $D_{CR-OB}$ to $D_{CR-U2}$ is greater than 1.2 for all zoom positions of the lens.

As shown in Table 7, relationship (3) is also satisfied for the lenses of Examples 1–5.

With regard to aberration correction, for the zoom ranges set forth in Tables 1–5, the lenses achieve distortions of less than 2.5% and color corrections of better than a pixel for wavelengths between 470 nanometers and 630 nanometers.

Although specific embodiments of the invention have been described and illustrated, it is to be understood that a variety of modifications which do not depart from the scope and spirit of the invention will be evident to persons of ordinary skill in the art from the foregoing disclosure.

TABLE 1

| Surf. No. | Type | Radius | Thickness | Glass | Clear Aperture Diameter |
|---|---|---|---|---|---|
| 1 | a | 72.2998 | 4.00000 | ACRYLIC | 49.42 |
| 2 | a | 24.4899 | 27.09795 | | 38.58 |
| 3 | | −85.0790 | 3.00000 | LAK8 | 29.71 |
| 4 | | 55.3261 | 0.50000 | | 28.45 |
| 5 | | 47.0661 | 5.00000 | SF6 | 28.48 |
| 6 | | 201.3419 | Space 1 | | 27.61 |
| 7 | | Aperture stop | 1.99828 | | 21.15 |
| 8 | | 211.5049 | 6.00000 | LF6 | 21.74 |
| 9 | | −22.4657 | 2.00000 | SK18 | 22.22 |
| 10 | | −56.6906 | 28.90509 | | 23.16 |
| 11 | | −29.6643 | 2.00000 | SF6 | 28.85 |
| 12 | | −374.7046 | 7.00000 | FK5 | 32.26 |
| 13 | | −42.3814 | 0.50000 | | 35.10 |
| 14 | | 152.2023 | 9.00000 | SK5 | 39.53 |
| 15 | | −43.8850 | 0.50000 | | 40.55 |
| 16 | | −258.2722 | 6.00000 | ACRYLIC | 40.50 |
| 17 | a | −72.1510 | Space 2 | | 40.70 |
| 18 | a | −975.9416 | 4.00000 | ACRYLIC | 37.99 |
| 19 | | −165.2441 | 1.00000 | | 37.79 |
| 20 | | ∞ | 70.67000 | BK7 | 37.36 |
| 21 | | ∞ | 3.00000 | ZK7 | 27.73 |
| 22 | | ∞ | Image distance | | 27.32 |

Symbol Description
a — Polynomial asphere

Even Polynomial Aspheres

| Surf. No. | D | E | F | G | H | I |
|---|---|---|---|---|---|---|
| 1 | 2.5042E−05 | −4.6111E−08 | 2.8946E−12 | 1.5904E−13 | −2.3985E−16 | 1.1367E−19 |
| 2 | 2.7558E−05 | −5.3311E−09 | −2.9095E−10 | 9.0640E−13 | −7.1726E−16 | 1.7276E−19 |
| 17 | 2.2010E−06 | 9.2620E−10 | −1.0191E−13 | 5.8030E−16 | −2.6548E−19 | 5.8635E−22 |
| 18 | −7.1025E−07 | −6.9015E−12 | 1.3363E−12 | −1.4732E−15 | −2.1087E−18 | 9.5727E−22 |

Variable Spaces

| Zoom Pos. | Space 1 T(6) | Space 2 T(17) | Focal Shift | Image Distance |
|---|---|---|---|---|
| 1 | 53.901 | 2.000 | 0.000 | 10.500 |
| 2 | 20.228 | 18.917 | −0.086 | 10.500 |
| 3 | 3.000 | 35.978 | −0.053 | 10.500 |

First-Order Data

| | | | |
|---|---|---|---|
| f/number | 2.85 | 2.90 | 3.00 |
| Magnification | −0.0050 | −0.0050 | −0.0050 |
| Object Height | −2500.0 | −2500.0 | −2500.0 |
| Object Distance | −4160.6 | −6167.2 | −8173.2 |
| Effective Focal Length | 21.000 | 31.000 | 41.000 |
| Image Distance | 10.500 | 10.500 | 10.500 |
| Overall Length | 4409.1 | 6399.0 | 8404.8 |
| Forward Vertex Distance | 248.57 | 231.82 | 231.65 |
| Barrel Length | 238.07 | 221.32 | 221.15 |
| Stop Surface Number | 7 | 7 | 7 |
| Distance to Stop | 0.00 | 0.00 | 0.00 |
| Stop Diameter | 20.156 | 20.748 | 20.983 |
| Entrance Pupil Distance | 39.704 | 33.283 | 27.383 |
| Exit Pupil Distance | −1614.0 | −2123.6 | −2999.3 |

First Order Properties of Elements

| Element Number | Surface Numbers | | Power | f |
|---|---|---|---|---|
| 1 | 1 | 2 | −0.12964E−01 | −77.136 |
| 2 | 3 | 4 | −0.21552E−01 | −46.399 |

TABLE 1-continued

| | | | | |
|---|---|---|---|---|
| 3 | 5 | 6 | 0.13422E−01 | 74.504 |
| 4 | 8 | 9 | 0.27828E−01 | 35.935 |
| 5 | 9 | 10 | −0.16839E−01 | −59.384 |
| 6 | 11 | 12 | −0.25160E−01 | −39.745 |
| 7 | 12 | 13 | 0.10307E−01 | 97.023 |
| 8 | 14 | 15 | 0.17066E−01 | 58.595 |
| 9 | 16 | 17 | 0.49844E−02 | 200.63 |
| 10 | 18 | 19 | 0.24863E−02 | 402.21 |

First-Order Properties of Doublets

| Element Numbers | | Surface Numbers | | Power |
|---|---|---|---|---|
| 4 | 5 | 8 | 10 | 0.10778E−01 |
| 6 | 7 | 11 | 13 | −0.13177E−01 |

TABLE 2

| Surf. No. | Type | Radius | Thickness | Glass | Clear Aperture Diameter |
|---|---|---|---|---|---|
| 1 | a | 97.9903 | 4.00000 | ACRYLIC | 47.22 |
| 2 | a | 23.9903 | 20.98199 | | 37.28 |
| 3 | | −80.1623 | 3.00000 | TAF1 | 31.50 |
| 4 | | 56.3974 | 5.00000 | SF57 | 30.71 |
| 5 | | −725.7978 | Space 1 | | 30.49 |
| 6 | | Aperture stop | 3.02983 | | 21.78 |
| 7 | | 68.8076 | 2.00000 | SSK5 | 22.87 |
| 8 | | 33.5003 | 6.00000 | LF5 | 23.08 |
| 9 | | −125.9711 | 26.49730 | | 23.45 |
| 10 | | −27.8264 | 2.00000 | SF11 | 25.18 |
| 11 | | −1505.6150 | 7.00000 | FK5 | 28.37 |
| 12 | | −40.8821 | 0.50000 | | 31.48 |
| 13 | | −528.5488 | 6.00000 | BAK4 | 34.11 |
| 14 | | −55.4622 | 0.20000 | | 35.77 |
| 15 | | −528.5488 | 6.00000 | BAK4 | 36.91 |
| 16 | | −55.4622 | 0.50000 | | 37.74 |
| 17 | a | −120.0000 | 5.00000 | ACRYLIC | 37.81 |
| 18 | a | −69.2027 | Space 2 | | 38.36 |
| 19 | a | ∞ | 4.00000 | ACRYLIC | 37.11 |
| 20 | a | −144.0249 | 1.00000 | | 36.86 |
| 21 | | ∞ | 70.67000 | BK7 | 36.45 |
| 22 | | ∞ | 3.00000 | ZK7 | 27.44 |
| 23 | | ∞ | Image distance | | 27.05 |

Symbol Description
a — Polynomial asphere

Even Polynomial Aspheres

| Surf. No. | D | E | F | G | H | I |
|---|---|---|---|---|---|---|
| 1 | 1.4196E−05 | −3.1124E−08 | 7.2170E−12 | 1.4060E−13 | −2.5612E−16 | 1.3642E−19 |
| 2 | 1.1526E−05 | 9.3457E−10 | −2.7899E−10 | 9.4564E−13 | −4.6984E−16 | −1.0955E−18 |
| 17 | −7.0619E−07 | 1.5712E−11 | −2.0515E−13 | 2.1405E−15 | 6.4550E−18 | −3.2905E−20 |
| 18 | 2.0465E−07 | −5.1086E−10 | 2.0254E−12 | 3.0081E−15 | −1.0258E−17 | −6.5138E−21 |
| 19 | −1.2834E−06 | −3.3184E−10 | 3.1373E−12 | 5.1744E−16 | 1.4226E−17 | 7.0676E−20 |
| 20 | −1.9866E−07 | 9.8049E−10 | −2.7704E−13 | 2.2504E−15 | 1.6525E−17 | 8.5178E−20 |

Variable Spaces

| Zoom Pos. | Space 1 T(5) | Space 2 T(18) | Focal Shift | Image Distance |
|---|---|---|---|---|
| 1 | 53.893 | 2.000 | 0.003 | 10.500 |
| 2 | 22.123 | 21.249 | −0.205 | 10.501 |
| 3 | 6.488 | 40.981 | −0.028 | 10.500 |

First-Order Data

| | | | |
|---|---|---|---|
| f/number | 2.70 | 2.85 | 3.00 |
| Magnification | −0.0050 | −0.0050 | −0.0200 |
| Object Height | −2500.0 | −2500.0 | −625.00 |
| Object Distance | −4179.1 | −6171.7 | −2002.6 |
| Effective Focal Length | 21.071 | 31.005 | 40.544 |

TABLE 2-continued

| | | | |
|---|---|---|---|
| Image Distance | 10.500 | 10.501 | 10.500 |
| Overall Length | 4421.9 | 6402.0 | 2237.0 |
| Forward Vertex Distance | 242.77 | 230.25 | 234.35 |
| Barrel Length | 232.27 | 219.75 | 223.85 |
| Stop Surface Number | 6 | 6 | 6 |
| Distance to Stop | 0.00 | 0.00 | 0.00 |
| Stop Diameter | 21.466 | 21.493 | 21.492 |
| Entrance Pupil Distance | 35.172 | 29.257 | 24.222 |
| Exit Pupil Distance | −4000.1 | −.10530E+06 | 4737.3 |

First Order Properties of Elements

| Element Number | Surface Numbers | | Power | f |
|---|---|---|---|---|
| 1 | 1 | 2 | −0.15266E−01 | −65.507 |
| 2 | 3 | 4 | −0.23671E−01 | −42.245 |
| 3 | 4 | 5 | 0.16291E−01 | 61.384 |
| 4 | 7 | 8 | −0.99041E−02 | −100.97 |
| 5 | 8 | 9 | 0.21793E−01 | 45.887 |
| 6 | 10 | 11 | −0.27916E−01 | −35.822 |
| 7 | 11 | 12 | 0.11658E−01 | 85.777 |
| 8 | 13 | 14 | 0.92614E−02 | 107.97 |
| 9 | 15 | 16 | 0.92614E−02 | 107.97 |
| 10 | 17 | 18 | 0.31187E−02 | 320.65 |
| 11 | 19 | 20 | 0.34284E−02 | 291.68 |

First-Order Properties of Doublets

| Element Numbers | | Surface Numbers | | Power | f |
|---|---|---|---|---|---|
| 2 | 3 | 3 | 5 | −0.70388E−02 | −142.07 |
| 4 | 5 | 7 | 9 | 0.11810E−01 | 84.671 |
| 6 | 7 | 10 | 12 | −0.14317E−01 | −69.845 |

TABLE 3

| Surf. No. | Type | Radius | Thickness | Glass | Clear Aperture Diameter |
|---|---|---|---|---|---|
| 1 | | ∞ | 0.00000 | | 149.44 |
| 2 | a | −2758.9689 | 10.00000 | ACRYLIC | 121.89 |
| 3 | a | 162.7148 | 32.41289 | | 97.02 |
| 4 | | 1317.9611 | 6.00000 | LAK8 | 94.74 |
| 5 | | 71.7345 | 5.58533 | | 88.03 |
| 6 | | 106.5479 | 10.50000 | SF6 | 88.04 |
| 7 | | 285.6476 | 0.20000 | | 87.95 |
| 8 | a | 140.6917 | 10.50000 | ACRYLIC | 88.88 |
| 9 | a | 226.6795 | Space 1 | | 88.38 |
| 10 | | Aperture stop | 10.00000 | | 59.29 |
| 11 | | −115.7482 | 4.00000 | LAK8 | 60.96 |
| 12 | | 372.6067 | 0.20000 | | 65.49 |
| 13 | | 115.6547 | 14.00000 | SF2 | 69.87 |
| 14 | | −160.1106 | 1.00000 | | 71.15 |
| 15 | a | −353.2545 | 6.00000 | ACRYLIC | 71.40 |
| 16 | a | −206.8843 | 5.68170 | | 73.56 |
| 17 | | −257.8060 | 11.00000 | BK7 | 75.56 |
| 18 | | −80.6332 | 0.50000 | | 76.93 |
| 19 | | −96.1449 | 5.00000 | SF6 | 76.87 |
| 20 | | 795.2449 | 6.88605 | | 82.05 |
| 21 | | −6516.3498 | 22.00000 | BK7 | 86.61 |
| 22 | | −67.0669 | Space 2 | | 89.24 |
| 23 | a | −90.0000 | 6.00000 | ACRYLIC | 88.35 |
| 24 | a | −86.0735 | Image distance | | 89.82 |

Symbol Description
a — Polynomial asphere

Even Polynomial Aspheres

| Surf. No. | D | E | F | G | H | I |
|---|---|---|---|---|---|---|
| 2 | 3.0424E−06 | −8.1984E−10 | 1.4501E−13 | 5.7852E−18 | −2.4707E−21 | −9.0217E−26 |
| 3 | 3.4492E−06 | −1.7946E−10 | −3.3006E−13 | 2.9306E−16 | −7.8431E−20 | 1.8517E−23 |
| 8 | −4.7800E−07 | 1.0095E−10 | 7.9308E−14 | 4.2610E−17 | −3.4798E−21 | −7.6237E−24 |

TABLE 3-continued

| | | | | | | |
|---|---|---|---|---|---|---|
| 9 | −9.8746E−07 | 7.2987E−11 | 4.3678E−14 | 1.2424E−17 | 3.7489E−24 | −6.9653E−24 |
| 15 | −7.6932E−07 | −1.4655E−10 | −5.4268E−14 | 7.2357E−18 | 5.3795E−21 | −5.3761E−26 |
| 16 | 4.4139E−07 | −4.9168E−11 | 9.3095E−15 | 1.1944E−18 | −5.2487E−21 | 3.9426E−24 |
| 23 | 7.6092E−08 | 2.5927E−11 | 4.1204E−15 | 1.8260E−18 | 2.8035E−21 | 1.5980E−25 |
| 24 | 1.3565E−07 | 2.0958E−11 | 1.1490E−14 | −7.6191E−18 | 7.3884E−21 | −8.4099E−25 |

Variable Spaces

| Zoom Pos. | Space 1 T(9) | Space 2 T(22) | Focal Shift | Image Distance |
|---|---|---|---|---|
| 1 | 148.330 | 1.856 | 0.603 | 280.004 |
| 2 | 68.874 | 63.419 | 0.256 | 279.998 |
| 3 | 29.152 | 125.088 | −0.226 | 279.986 |

First-Order Data

| | | | |
|---|---|---|---|
| f/number | 3.82 | 4.41 | 5.00 |
| Magnification | −0.0100 | −0.0125 | −0.0150 |
| Object Height | −5800.0 | −4640.0 | −3866.7 |
| Object Distance | −9919.6 | −11963. | −13338. |
| Effective Focal Length | 100.00 | 150.00 | 200.00 |
| Image Distance | 280.00 | 280.00 | 279.99 |
| Overall Length | 10517. | 12543. | 13939. |
| Forward Vertex Distance | 597.66 | 579.76 | 601.69 |
| Barrel Length | 317.65 | 299.76 | 321.71 |
| Stop Surface Number | 10 | 10 | 10 |
| Distance to Stop | 0.00 | 0.00 | 0.00 |
| Stop Diameter | 58.448 | 58.404 | 58.419 |
| Entrance Pupil Distance | 105.35 | 84.275 | 68.015 |
| Exit Pupil Distance | −126.58 | −198.81 | −274.96 |

First Order Properties of Elements

| Element Number | Surface Numbers | | Power | f |
|---|---|---|---|---|
| 1 | 2 | 3 | −0.32172E−02 | −310.83 |
| 2 | 4 | 5 | −0.94211E−02 | −106.14 |
| 3 | 6 | 7 | 0.49078E−02 | 203.76 |
| 4 | 8 | 9 | 0.13851E−02 | 721.99 |
| 5 | 11 | 12 | −0.81369E−02 | −122.90 |
| 6 | 13 | 14 | 0.95182E−02 | 105.06 |
| 7 | 15 | 16 | 0.10023E−02 | 997.67 |
| 8 | 17 | 18 | 0.45148E−02 | 221.49 |
| 9 | 19 | 20 | −0.94980E−02 | −105.29 |
| 10 | 21 | 22 | 0.76637E−02 | 130.49 |
| 11 | 23 | 24 | 0.37670E−03 | 2654.7 |

TABLE 4

| Surf. No. | Type | Radius | Thickness | Glass | Clear Aperture Diameter |
|---|---|---|---|---|---|
| 1 | | ∞ | 17.00229 | | 276.02 |
| 2 | a | 237.1932 | 15.00000 | ACRYLIC | 212.50 |
| 3 | a | 90.8590 | 82.32077 | | 168.71 |
| 4 | a | −247.2009 | 10.00000 | ACRYLIC | 160.28 |
| 5 | | 529.5923 | 0.50000 | | 158.89 |
| 6 | | 187.5174 | 13.00000 | SF6 | 159.93 |
| 7 | | 348.1046 | Space 1 | | 158.38 |
| 8 | a | 221.8899 | 12.00000 | ACRYLIC | 115.07 |
| 9 | a | 1611.4189 | 63.03422 | | 113.28 |
| 10 | | −272.3091 | 7.00000 | SF4 | 123.18 |
| 11 | | 2233.7061 | 0.50000 | | 129.22 |
| 12 | | 388.2929 | 29.00000 | BK7 | 133.52 |
| 13 | | −117.0573 | 0.50000 | | 134.27 |
| 14 | a | −534.1219 | 12.00000 | ACRYLIC | 131.82 |
| 15 | a | −489.5588 | Space 2 | | 132.53 |
| 16 | a | −193.4819 | 14.00000 | ACRYLIC | 146.65 |
| 17 | a | −124.8392 | 0.50000 | | 147.01 |
| 18 | | −168.3820 | 8.00000 | F2 | 146.95 |
| 19 | | −286.9523 | Image distance | | 151.88 |

Symbol Description
a — Polynomial asphere

TABLE 4-continued

Even Polynomial Aspheres

| Surf. No. | D | E | F | G | H | I |
|---|---|---|---|---|---|---|
| 2 | 3.5251E−08 | 3.2290E−12 | −4.3225E−17 | 2.0451E−20 | −4.9581E−24 | 2.7651E−28 |
| 3 | −4.1104E−08 | −7.3823E−13 | 9.6994E−17 | 6.1436E−20 | −9.4222E−24 | −3.0426E−27 |
| 4 | −3.8044E−08 | −1.9972E−12 | 1.1467E−15 | −1.8033E−19 | −7.7360E−24 | 1.8761E−27 |
| 8 | −7.9932E−08 | 1.6498E−13 | −8.3436E−15 | 3.5489E−18 | −5.8447E−22 | 3.8050E−26 |
| 9 | 8.5788E−09 | −6.5729E−12 | 1.6655E−15 | 4.1854E−19 | −2.8205E−23 | 8.6648E−28 |
| 14 | −1.1719E−07 | 1.0781E−11 | −2.3805E−16 | 3.9958E−19 | −1.1846E−22 | 9.4444E−27 |
| 15 | −4.6160E−08 | 9.1968E−12 | 1.8379E−15 | −2.1439E−19 | −2.0830E−23 | 3.5330E−27 |
| 16 | 2.7832E−08 | 6.0546E−12 | 2.1169E−15 | 2.8769E−19 | 1.4529E−24 | −1.8868E−28 |
| 17 | 6.0329E−08 | 9.0569E−12 | 9.7519E−16 | 3.0046E−19 | 4.1042E−23 | −2.7867E−27 |

Variable Spaces

| Zoom Pos. | Space 1 T(7) | Space 2 T(15) | Focal Shift | Image Distance |
|---|---|---|---|---|
| 1 | 196.719 | 60.449 | −0.102 | 316.956 |
| 2 | 94.237 | 138.001 | 0.452 | 316.993 |
| 3 | 35.717 | 224.093 | 0.744 | 317.058 |

First-Order Data

| | | | |
|---|---|---|---|
| f/number | 3.70 | 4.35 | 5.05 |
| Magnification | −0.0100 | −0.0150 | −0.0200 |
| Object Height | −10890. | −7260.0 | −5445.0 |
| Object Distance | −16973. | −16413. | −16578. |
| Effective Focal Length | 170.95 | 246.95 | 330.97 |
| Image Distance | 316.96 | 316.99 | 317.06 |
| Overall Length | 17832. | 17247. | 17439. |
| Forward Vertex Distance | 858.48 | 833.59 | 861.23 |
| Barrel Length | 541.52 | 516.60 | 544.17 |
| Stop Surface Number | 9 | 9 | 9 |
| Distance to Stop | 31.52 | 31.52 | 31.52 |
| Stop Diameter | 103.695 | 103.446 | 103.870 |
| Entrance Pupil Distance | 182.32 | 159.29 | 140.50 |
| Exit Pupil Distance | −165.15 | −246.68 | −336.51 |

First Order Properties of Elements

| Element Number | Surface Numbers | | Power | f' |
|---|---|---|---|---|
| 1 | 2 | 3 | −0.32392E−02 | −308.72 |
| 2 | 4 | 5 | −0.29423E−02 | −339.87 |
| 3 | 6 | 7 | 0.20718E−02 | 482.68 |
| 4 | 8 | 9 | 0.19244E−02 | 519.65 |
| 5 | 10 | 11 | −0.31418E−02 | −318.29 |
| 6 | 12 | 13 | 0.56542E−02 | 176.86 |
| 7 | 14 | 15 | 0.91642E−04 | 10912. |
| 8 | 16 | 17 | 0.14978E−02 | 667.62 |
| 9 | 18 | 19 | −0.14918E−02 | −670.35 |

TABLE 5

| Surf. No. | Type | Radius | Thickness | Glass | Clear Aperture Diameter |
|---|---|---|---|---|---|
| 1 | | ∞ | 6.09264 | | 215.77 |
| 2 | | 469.1296 | 12.00000 | F2 | 206.04 |
| 3 | | 176.4976 | 0.50000 | | 193.30 |
| 4 | a | 152.1949 | 42.83528 | ACRYLIC | 193.71 |
| 5 | | −1177.0830 | Space 1 | | 191.60 |
| 6 | a | 881.8484 | 15.00000 | ACRYLIC | 147.24 |
| 7 | | 112.3877 | 32.37052 | | 126.10 |
| 8 | a | −176.4906 | 14.00000 | ACRYLIC | 125.93 |
| 9 | a | −34734.4229 | 1.00000 | | 128.58 |
| 10 | | 234.1772 | 13.00000 | SF14 | 130.17 |
| 11 | | 867.4759 | Space 2 | | 129.18 |
| 12 | | 141.0650 | 23.00000 | FK5 | 121.51 |
| 13 | | −467.6623 | 0.50000 | | 120.70 |
| 14 | | 161.7719 | 14.00000 | LAK13 | 118.35 |
| 15 | | 500.3741 | 10.45864 | | 115.95 |

TABLE 5-continued

| | | | | | |
|---|---|---|---|---|---|
| 16 | | −465.6965 | 7.00000 | F2 | 114.16 |
| 17 | | 113.0470 | 11.91093 | | 109.21 |
| 18 | | 716.9085 | 15.00000 | FK5 | 109.18 |
| 19 | | −261.1313 | Space 3 | | 110.58 |
| 20 | | −131.9850 | 16.00000 | ACRYLIC | 121.32 |
| 21 | a | −135.9592 | 1.00000 | | 127.94 |
| 22 | | ∞ | −150.00000 | | 131.76 |
| 23 | | Aperture stop | Image distance | | 110.43 |

Symbol Description
a — Polynomial asphere

Even Polynomial Aspheres

| Surf. No. | D | E | F | G | H | I |
|---|---|---|---|---|---|---|
| 4 | −1.1309E−08 | −2.1131E−13 | −7.7869E−17 | 1.0282E−20 | −8.6300E−25 | 2.3371E−29 |
| 6 | 3.2299E−08 | 9.2468E−13 | 2.3854E−16 | 2.9361E−20 | −3.8454E−24 | 9.6267E−28 |
| 8 | 2.8793E−09 | −1.1965E−11 | 9.0379E−17 | −1.6077E−19 | −9.5758E−23 | 1.7893E−26 |
| 9 | 3.7715E−08 | −5.1432E−12 | −2.6470E−16 | 6.8702E−21 | −2.0528E−23 | 7.7139E−27 |
| 21 | 1.3255E−08 | 3.4416E−12 | −8.6612E−16 | 1.0710E−19 | −5.6243E−24 | 8.4682E−29 |

Variable Spaces

| Zoom Pos. | Space 1 T(5) | Space 2 T(11) | Space 3 T(19) | Focal Shift | Image Distance |
|---|---|---|---|---|---|
| 1 | 42.651 | 193.998 | 40.683 | −1.131 | 490.000 |
| 2 | 104.114 | 86.943 | 86.275 | −1.416 | 490.003 |
| 3 | 99.122 | 12.000 | 166.210 | 0.690 | 490.011 |

First-Order Data

| | | | |
|---|---|---|---|
| f/number | 4.50 | 4.50 | 5.13 |
| Magnification | −0.0200 | −0.0200 | −0.0200 |
| Object Height | −5500.0 | −5500.0 | −5500.0 |
| Object Distance | −16047. | −24147. | −32148. |
| Effective Focal Length | 322.41 | 480.94 | 634.64 |
| Image Distance | 490.00 | 490.00 | 490.01 |
| Overall Length | 16900. | 25000. | 33001. |
| Forward Vertex Distance | 853.00 | 853.00 | 853.01 |
| Barrel Length | 363.00 | 363.00 | 363.00 |
| Stop Surface Number | 23 | 23 | 23 |
| Distance to Stop | 0.00 | 0.00 | 0.00 |
| Stop Diameter | 109.917 | 109.944 | 95.868 |
| Entrance Pupil Distance | 287.75 | 379.76 | 429.26 |

First Order Properties of Elements

| Element Number | Surface Numbers | | Power | f |
|---|---|---|---|---|
| 1 | 2 | 3 | −0.21709E−02 | −460.65 |
| 2 | 4 | 5 | 0.36248E−02 | 275.88 |
| 3 | 6 | 7 | −0.38089E−02 | −262.55 |
| 4 | 8 | 9 | −0.27832E−02 | −359.30 |
| 5 | 10 | 11 | 0.24174E−02 | 413.66 |
| 6 | 12 | 13 | 0.44574E−02 | 224.35 |
| 7 | 14 | 15 | 0.29634E−02 | 337.45 |
| 8 | 16 | 17 | −0.68925E−02 | −145.09 |
| 9 | 18 | 19 | 0.25426E−02 | 393.30 |
| 10 | 20 | 21 | 0.36176E−04 | 27643. |

TABLE 6*

| | U1 | | U2 | | CR | | U3 | | | |
|---|---|---|---|---|---|---|---|---|---|---|
| Example | Surf. Nos. | $f_1$ | Surf. Nos. | $f_2$ | Surf. Nos. | $f_{CR}$ | Surf. Nos. | $f_3$ | $f_{min}$ | $f_{max}$ |
| 1 | 1–6 | −42.17 | 7–17 | 60.97 | 18–19 | 402.21 | — | — | 21.00 | 41.00 |
| 2 | 1–5 | −41.07 | 6–18 | 63.93 | 19–20 | 291.68 | — | — | 21.07 | 40.54 |
| 3 | 1–9 | −152.48 | 10–22 | 170.53 | 23–24 | 2654.70 | — | — | 100.00 | 200.00 |

TABLE 6*-continued

| | U1 | | U2 | | CR | | U3 | | | |
|---|---|---|---|---|---|---|---|---|---|---|
| Example | Surf. Nos. | $f_1$ | Surf. Nos. | $f_2$ | Surf. Nos. | $f_{CR}$ | Surf. Nos. | $f_3$ | $f_{min}$ | $f_{max}$ |
| 4 | 1–7 | −228.67 | 8–15 | 237.36 | 16–19 | −22457.00 | — | — | 170.95 | 330.97 |
| 5 | 6–11 | −244.60 | 12–19 | 260.03 | 20–21 | 27643.00 | 1–5 | 690.42 | 322.41 | 634.64 |

*$f_1$, $f_2$, $f_{CR}$ and $f_3$ are focal lengths of the corresponding lens units, and $f_{min}$ and $f_{max}$ are focal lengths of the lens as a whole at the shortest and the longest end of the zoom range, respectively.

TABLE 7

| Example | $D_{CR-OB}/f_{min}$ | ½ Field of View at $f_{min}$ | $D_{CR-OB}/(f_{min} \cdot \tan \omega)$ |
|---|---|---|---|
| 1 | 2.86 | 30.8° | 4.80 |
| 2 | 2.86 | 30.7° | 4.82 |
| 3 | 2.80 | 30.1° | 4.83 |
| 4 | 1.86 | 32.4° | 2.93 |
| 5 | 1.07 | 18.6° | 3.18 |

What is claimed is:

1. A projection lens for forming an image of an object, said lens having a zoom range between a minimum effective focal length $f_{min}$ and a maximum effective focal length $f_{max}$, said lens comprising in order from its image end to its object end:

(A) a first lens unit;

(B) a second lens unit separated from the first lens unit by an axial space, said first and second lens units being moved relative to the object during zooming and/or focusing of the lens; and (C) a corrector lens unit having at least one aspherical surface and a focal length $f_{CR}$ which satisfies the relationship:

$$|f_{CR}/f_{min}| \geq 5;$$

said corrector lens unit (i) constituting the object end of the projection lens and (ii) being separated from the object by a fixed axial distance $D_{CR-OB}$ and from the second lens unit by a variable axial distance $D_{CR-U2}$ where:

$$D_{CR-OB} \geq D_{CR-U2}$$

for all effective focal lengths of the lens between $f_{min}$ and $f_{max}$.

2. The projection lens of claim 1 wherein:

$$|f_{CR}/f_{min}| \geq 10.$$

3. The projection lens of claim 1 where the lens satisfies the relationship:

$$D_{CR-OB}/(f_{min} \cdot \tan \omega) \geq 2$$

where ω is the projection lens' half field of view in the direction of the image when the lens' effective focal length is equal to $f_{min}$.

4. The projection lens of claim 1 wherein the first lens unit has a negative optical power.

5. The projection lens of claim 1 wherein the second lens unit has a positive optical power.

6. The projection lens of claim 1 wherein the first lens unit has a negative optical power and the second lens unit has a positive optical power.

7. The projection lens of claim 1 wherein the corrector lens unit comprises color correcting means.

8. The projection lens of claim 1 further comprising a third lens unit on the image side of the first lens unit.

9. The projection lens of claim 8 wherein the third lens unit is separated from the object by a fixed axial distance.

10. The projection lens of claim 8 wherein the third lens unit has a positive power.

11. The projection lens of claim 1 wherein the distortion of the projection lens over the zoom range is less than or equal to 2.5 percent.

12. The projection lens of claim 1 wherein the object is a pixelized panel and the lateral color blur of the lens over the zoom range is less than a pixel for wavelengths in the range from 465 nanometers to 608 nanometers.

13. The projection lens of claim 1 wherein the lens' back focal length changes by less than 0.2 percent as the lens is heated from room temperature to its operating temperature.

14. A projection lens system for forming an image of an object, said system comprising:

(A) an illumination system comprising a light source and illumination optics which forms an image of the light source;

(B) a pixelized panel which comprises the object; and (C) a projection lens for forming an image of the object, said lens having a zoom range between a minimum effective focal length $f_{min}$ and a maximum effective focal length $f_{max}$, said lens comprising in order from its image end to its object end:

(a) a first lens unit;

(b) a second lens unit separated from the first lens unit by an axial space, said first and second lens units being moved relative to the object during zooming and/or focusing of the lens; and (c) a corrector lens unit having at least one aspherical surface and a focal length $f_{CR}$ which satisfies the relationship:

$$|f_{CR}/f_{min}| \geq 5;$$

said corrector lens unit being separated from the object by a fixed axial distance $D_{CR-OB}$ and from the second lens unit by a variable axial distance $D_{CR-U2}$ where:

$$D_{CR-OB} \geq D_{CR-U2}$$

for all effective focal lengths of the lens between $f_{min}$ and $f_{max}$.

15. The projection lens system of claim 14 wherein said projection lens has an entrance pupil whose location substantially corresponds to the location of the output of the illumination system.

* * * * *

UNITED STATES PATENT AND TRADEMARK OFFICE
CERTIFICATE OF CORRECTION

PATENT NO.    : 6,417,971 B1
DATED         : July 9, 2002
INVENTOR(S)   : Jacob Moskovich It is certified that error appears in the above-identified patent and that said Letters Patent is hereby corrected as shown below:

<u>Title page,</u>
Item "[22] PCT Filed: Aug. 5, 1997" should be corrected to show -- [22] PCT Filed: July 30, 1998 --
Please add the following to U.S. PATENT DOCUMENTS

| | | | | |
|---|---|---|---|---|
| -- | 4,189,211 | 2/1980 | Taylor | 359/663 |
| | 5,042,929 | 8/1991 | Tanaka et al | 359/708 |
| | 5,179,473 | 1/1993 | Yano et al | 359/691 |
| | 5,200,861 | 4/1993 | Moskovich | 359/662 |
| | 5,218,480 | 6/1993 | Moskovich | 359/753 |
| | 5,278,698 | 1/1994 | Iizuka et al | 359/682 |
| | 5,331,462 | 7/1994 | Yano | 359/686 |
| | 5,625,495 | 4/1997 | Moskovich | 359/663 |
| | 5,900,987 | 5/1999 | Kreitzer | 359/649 |
| | 5,900,989 | 5/1999 | Kreitzer | 359/691 |

FOREIGN PATENT DOCUMENTS
WO        WO96/18124           6/1996 --

Signed and Sealed this

Twenty-fifth Day of March, 2003

JAMES E. ROGAN
*Director of the United States Patent and Trademark Office*